(12) United States Patent
Biermann et al.

(10) Patent No.: US 9,341,251 B2
(45) Date of Patent: May 17, 2016

(54) SUPPORTING AND GUIDING DISK IN A PLANETARY GEAR TRAIN

(71) Applicant: Schaeffler Technologies GmbH & Co. KG, Herzogenaurach (DE)

(72) Inventors: Thorsten Biermann, Wachenroth (DE); Harald Martini, Herzogenaurach (DE); Inaki Fernandez, Nuremberg (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/403,834

(22) PCT Filed: Mar. 28, 2013

(86) PCT No.: PCT/EP2013/056650
§ 371 (c)(1),
(2) Date: Nov. 25, 2014

(87) PCT Pub. No.: WO2013/174552
PCT Pub. Date: Nov. 28, 2013

(65) Prior Publication Data
US 2015/0126322 A1    May 7, 2015

(30) Foreign Application Priority Data

May 25, 2012 (DE) .......................... 10 2012 208 799
May 25, 2012 (DE) .......................... 10 2012 208 805

(51) Int. Cl.
| | |
|---|---|
| F16H 48/38 | (2012.01) |
| F16H 48/11 | (2012.01) |
| F16C 17/10 | (2006.01) |
| F16H 57/08 | (2006.01) |
| F16H 48/10 | (2012.01) |
| F16H 48/36 | (2012.01) |
| F16H 48/42 | (2012.01) |

(52) U.S. Cl.
CPC .............. *F16H 48/11* (2013.01); *F16C 17/107* (2013.01); *F16H 48/10* (2013.01); *F16H 48/38* (2013.01); *F16H 57/08* (2013.01); *F16H 2048/106* (2013.01); *F16H 2048/364* (2013.01); *F16H 2048/423* (2013.01); *F16H 2048/426* (2013.01)

(58) Field of Classification Search
None
See application file for complete search history.

(56) References Cited

U.S. PATENT DOCUMENTS

| | | | |
|---|---|---|---|
| 2,481,873 A | | 9/1949 | Randall |
| 3,251,244 A | * | 5/1966 | Nickell ................... F16H 48/10 475/252 |
| 4,574,658 A | | 3/1986 | Abbott et al. |
| 5,735,765 A | * | 4/1998 | Teraoka ................ F16H 48/285 475/160 |
| 7,329,203 B2 | | 2/2008 | Radinger et al. |
| 7,384,367 B2 | | 6/2008 | Radinger et al. |

(Continued)

FOREIGN PATENT DOCUMENTS

| | | |
|---|---|---|
| DE | 2031654 A1 | 1/1971 |
| DE | 10333880 A1 | 4/2005 |

(Continued)

*Primary Examiner* — Justin Holmes
(74) *Attorney, Agent, or Firm* — Simpson & Simpson, PLLC

(57) ABSTRACT

A gear unit combination including a differential transmission, a planetary gear stage, a common planet carrier, a plurality of planet sub-carriers arranged to have at least one external planet sub-carrier and to form the common planet carrier in a rotationally fixed manner, a bearing sleeve arranged within the at least one external planet sub-carrier, and at least one spur gear, wherein the bearing sleeve is arranged to radially position the at least one spur gear.

12 Claims, 14 Drawing Sheets

(56) References Cited

U.S. PATENT DOCUMENTS

| | | |
|---|---|---|
| 8,430,779 B2 | 4/2013 | Hoehn |
| 2004/0176208 A1* | 9/2004 | Asahi .................. F16H 48/10 475/249 |
| 2005/0209039 A1* | 9/2005 | Kempf ................. F16H 57/043 475/159 |
| 2010/0105515 A1* | 4/2010 | Goleski ............... F16H 57/082 475/341 |
| 2012/0028748 A1* | 2/2012 | Burgman ............. F16H 57/082 475/159 |

FOREIGN PATENT DOCUMENTS

| | | |
|---|---|---|
| DE | 10333879 A1 | 6/2005 |
| DE | 102007017185 A1 | 10/2008 |
| DE | 102008027992 A1 | 12/2009 |
| DE | 102009032286 A1 | 6/2010 |
| GB | 1212630 | 11/1970 |
| WO | 9311374 A1 | 6/1993 |
| WO | 0166973 A1 | 9/2001 |

\* cited by examiner

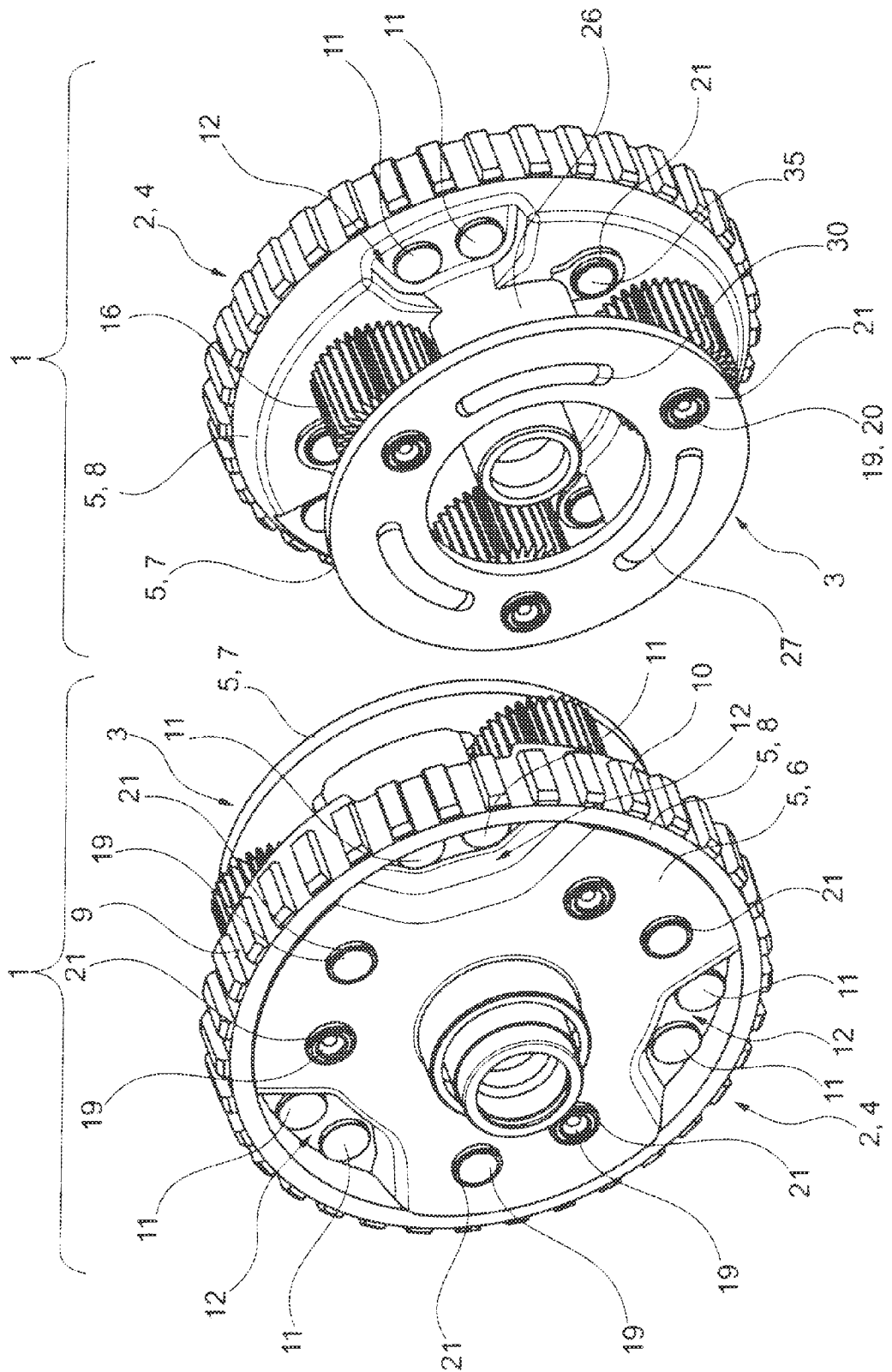

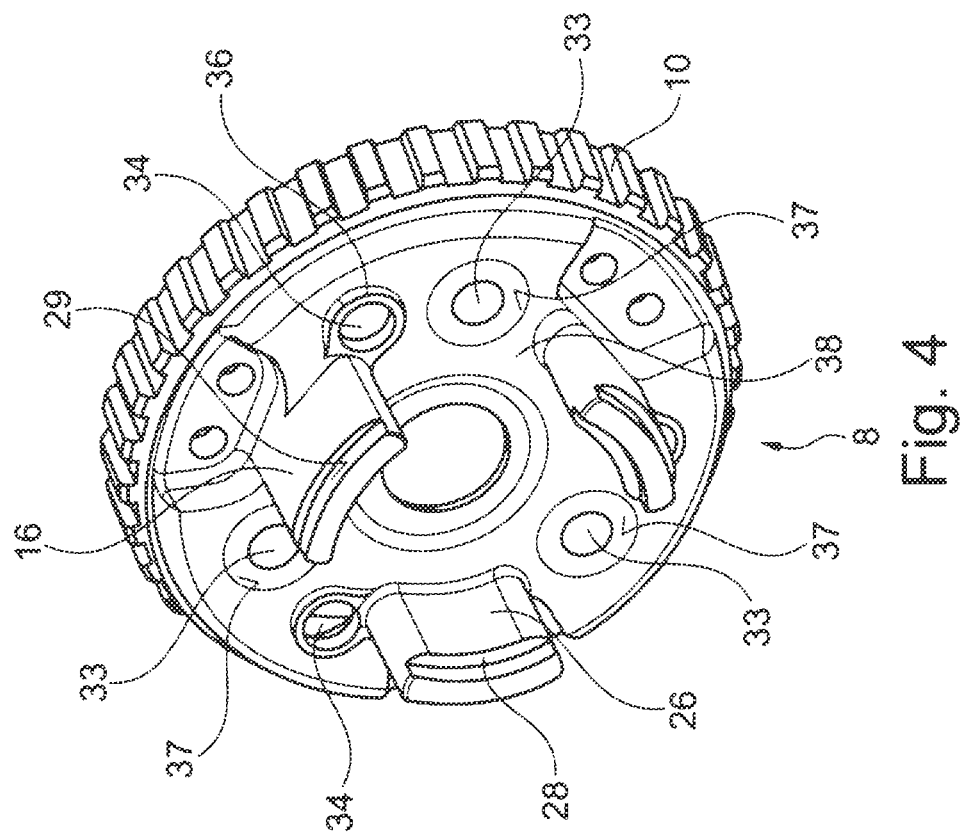
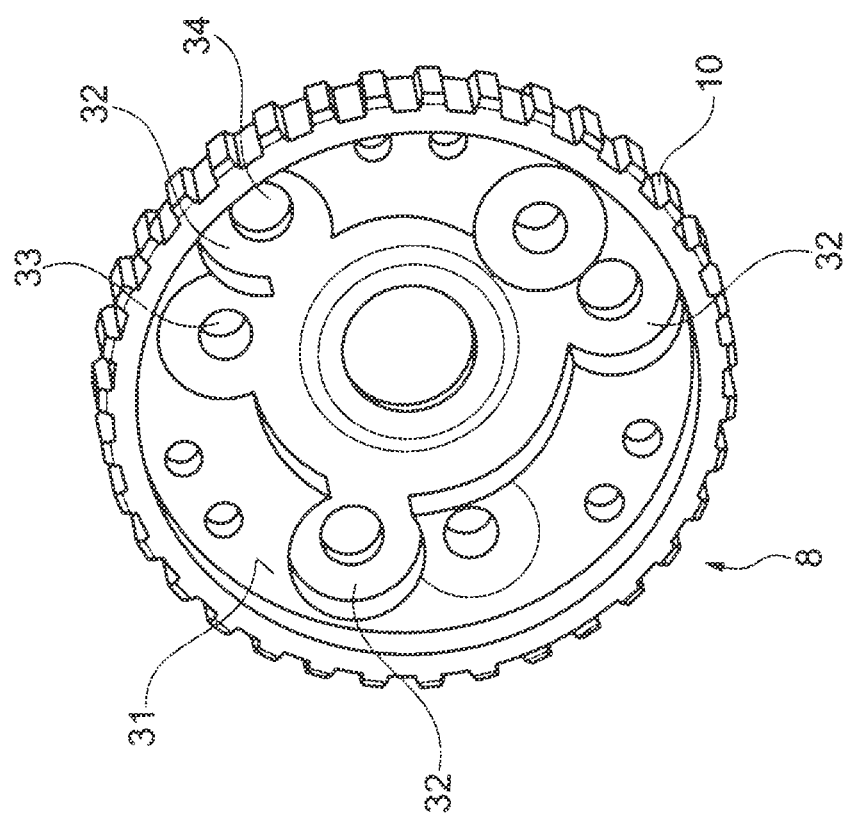

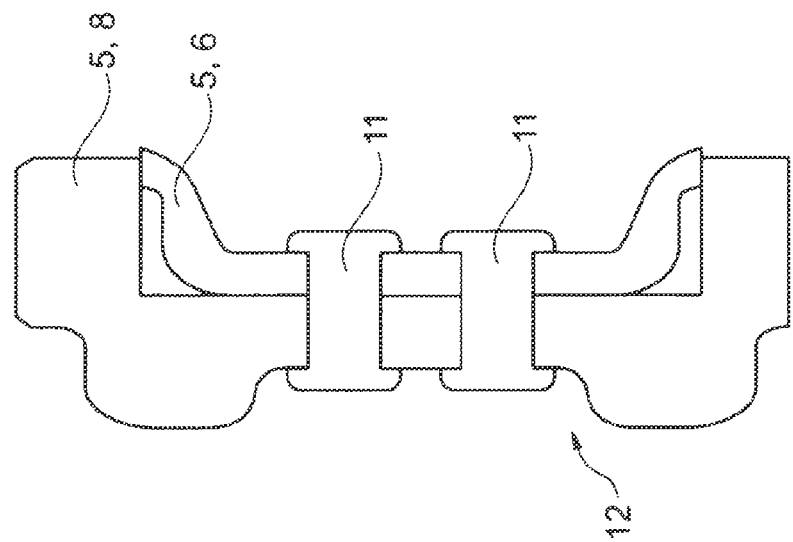
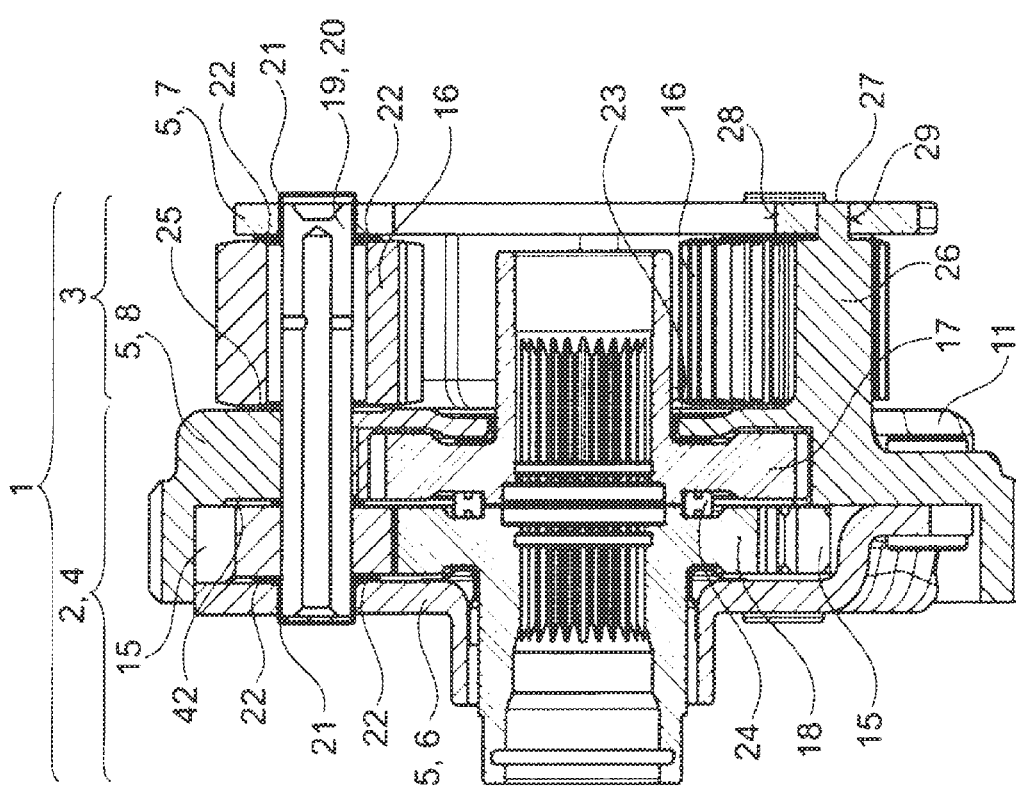

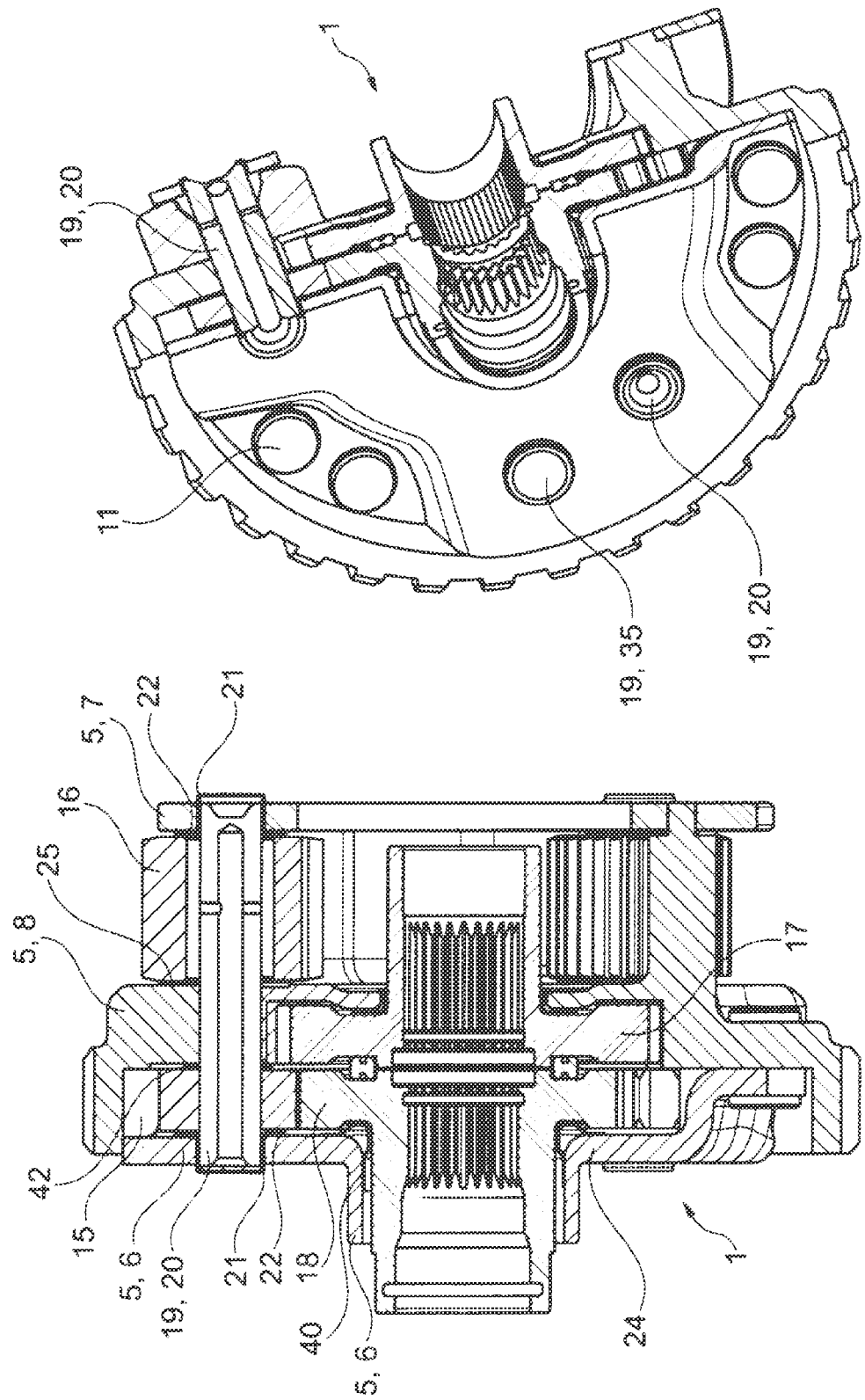

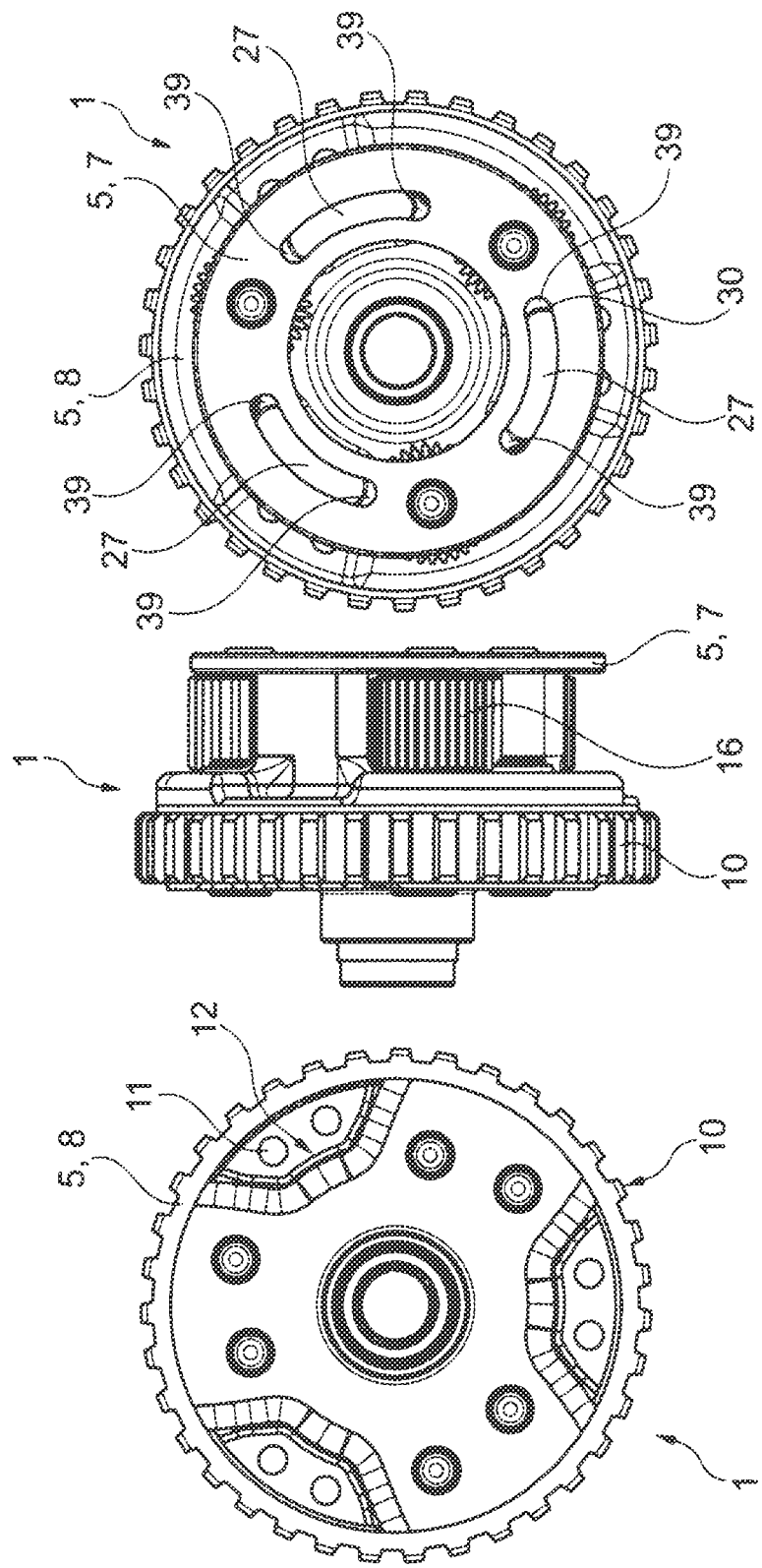

SUPPORTING AND GUIDING DISK IN A PLANETARY GEAR TRAIN

CROSS-REFERENCE TO RELATED APPLICATIONS

The present application is the U.S. national stage application pursuant to 35 U.S.C. §371 of International Application No. PCT/EP2013/056650, filed on Mar. 28, 2013, which application claims priority from German Patent Application Nos. DE 102012208799.0, filed on May 25, 2012 and DE 102012208805.9, filed on May 25, 2012, which applications are incorporated herein by reference in their entireties.

TECHNICAL FIELD

The present invention relates to a planetary gear unit including at least one sun gear and at least one planet carrier, which is arranged coaxially and rotatable in relation to the sun gear. Furthermore, the invention relates to a gear unit combination of a differential transmission and an additional planetary gear stage. In this case the differential transmission and the planetary gear stage have a common planet carrier, which is assembled from a plurality of planet sub-carriers in a rotationally fixed manner.

BACKGROUND

Gear unit combinations often use planetary gear units. Planetary gear units are known, for example, from DE 10 2009 032 286 A1, where the disclosed planetary gear unit has two sun gears, each of which is in meshing engagement with a set of planet gears, which are carried by a planet gear carrier. In this case, the sun gears are radially centered by means of the tooth forces, which in the normal operating mode act in the course of engaging with the planet gears. The drawback with this configuration in that the centering is not guaranteed or is only unsatisfactorily guaranteed under no-load condition, so that the position of the sun gears can tail very far from the radial center position. In addition, imbalances at the sun gears can occur in the normal operating mode despite the acting tooth forces. In addition, alignment errors between the sun gear and the planet carrier are possible. All of these factors lead to a higher degree of wear and an increase in the noise generation. This is especially true, if large forces are transmitted between the planet gears and the sun gears, such as, in particular, in the case of a differential.

Similar gear unit combinations are known, for example, from DE 10 2008 027 992 A1, which discloses a drive device that is intended for motor vehicles having four wheel drive and is provided for transverse installation. In the drive device an axle differential and an interaxle differential are designed in such a way that they are structurally combined in a transmission housing. In this case, the differentials are designed as planetary spur gears, including a first bar as the input element of the interaxle differential, the bar driving the sun gear as the one output element by means of the planet gears and driving the axle differential as the other output element by means of an external gear. In this case the external gear drives the output elements to the axle shafts by means of the bar of the axle differential and the planet gears thereof. This publication discloses that the two differentials are designed in terms of gear technology in such a way that they have a common bar. Hence, a spur gear differential and a planetary gear unit are combined as a superposition stage. However, the torque is tranferred from a front axle to a rear axle of the motor vehicle by way of the superposition stage.

An additional planetary gear unit is known from U.S. Pat. No. 4,574,658. However, in this case a planetary gear unit is combined with a spur gear superposition stage. A sun gear of the planetary gear unit is driven by an additional spur gear section by a pinion that is separate from the planetary gear unit.

The publications DE 2031654 A1 and GB 1212630 A also disclose gear unit combinations, in which different gear stages are connected to each other. These publications disclose, among other things, in particular, a rotationally rigid connection that constitutes a gear stage. The torsionally rigid connection includes two interacting gear elements, each of which carries a ring element that has an axially extending, cylindrical extension and that produces a rotationally rigid coupling with the ring element of the other gear element. In this case the ring elements are made of sheet metal and have in their cylindrical extension axially extending tooth-like indentations, which are in mutual engagement in a partial gear tooth system.

That planet carriers can also be welded together is also known from the publications DE 103 33 880 A1 and DE 103 33 879 A1.

A similar transfer case for motor vehicles is also known from DE 10 2007 017 185 B4, which discloses a transfer case for motor vehicles, the transfer case including a driven differential that drives two output shafts by equalizing elements, so that the output torque at the output shafts is variable by a superposition gear, which is formed by planetary gear units and which is drive-connected directly or indirectly to the output shafts, and by a drive motor, which is coupled to the superposition gear, and where the ratio of the superposition gear is designed in such a way that when the output shafts are in synchronization, the drive motor is stopped. In order to improve the redistribution in terms of precision and faster response with respect to the output torque in a structurally optimal design of the superposition gear and the drive motor, DE 10 2007 017 185 B4 discloses at least one torque-reducing epicyclic gear, which interacts with the differential, be disposed upstream of the superposition gear.

However, such planetary gear units and gear unit combinations have the drawback that they consist of a large number of components and require a relatively large amount of installation space. The production is relatively expensive, and the assembly is relatively complex.

SUMMARY

The object of the present invention is to remedy these drawbacks and to enable better use of the installation space at a lower cost and with greater ease of assembly. Furthermore, the object is to increase the resistance to wear.

This engineering object is achieved by the invention in that a bearing sleeve is inserted between the at least one sun gear and the planet carrier in such a way that the bearing sleeve acts in a supporting manner on the sun gear in the axial and/or radial direction in relation to the planet gear carrier.

In an example embodiment, a bearing sleeve is inserted into an external planet sub-carrier, which is a part of the differential transmission, in order to axially and/or radially position a spur gear, such as a sun gear.

The invention is also further developed by means of variants, which are claimed in the dependent claims and are explained in more detail below.

In an example embodiment, the bearing sleeve has at least one radial and/or axial bulge, so the sun gear can be accurately positioned in relation to one of the external planet sub-carriers.

In an example embodiment, it is advantageous for the bearing sleeve, which is configured as a sheet metal component, to be inserted, for example, pressed, radially into the external planet sub-carrier, in a force fit manner. Then the bearing sleeve is mounted in the external planet sub-carrier in such a way that it is firmly fixed in position, a feature that has the effect of reducing the play.

In an example embodiment, in order to increase the durability, it is advantageous for the bulge to be designed in such a way that the bulge is hardened at least in certain sections, so that the bearing sleeve also has elastic spring properties, fir example in at least sub-regions.

In an example embodiment, spatial efficiency is increased if the differential transmission is designed as a spur gear differential transmission that comprises many pairs of intermeshing planet gears, of which a first planet gear meshes with a first sun gear and the other second planet gear meshes with a second sun gear. In this case both planet gears and two planet sub-carriers of the planet carrier are mounted in a manner allowing rotation; and/or the first planet gear has a greater axial length than the second planet gear. Especially in the case of planet gears that are designed so as to have a varying length, it is possible to achieve a very compact design.

In an example embodiment, the bulge of the bearing sleeve is provided with a first hardness region, which extends axially in the direction of the two sun gears and/or is provided with a second hardness region, which extends radially inwards, and/or a third hardness region is provided on the bearing sleeve. This third hardness region is axially spaced apart from the second hardness region and is located on the sun gear distal side of the second hardness region. By providing the third hardness region, it is possible to increase the stability of the sun gear against tilting. In this case the first and second hardness regions assume, on the one hand, an axial securing function and, on the other hand, a radial securing function.

In an example embodiment, the tilt resistance of the bearing sleeve in turn is improved when the bearing sleeve has a supporting region, which extends radially outward from the bulge and which may be found in contact with the external planet sub-carrier.

In an example embodiment, one planet gear of each pair of planet gears is designed shorter than the other planet gear of this pair, and if a friction disk is arranged, for example, between the sun gears, so the net result may be a highly compact design of a device, and a desired locking effect may be achieved.

In an example embodiment, it is also advantageous for the surface region to be remachined, for example, remilled.

In an example embodiment, the planet carriers are mounted on pins that are mounted in at least two planet sub-carriers by means of sleeves that are, for example, hardened, so it is possible to dispense with an expensive hardening of the pins, and it is possible to use more economical pins. The sleeves, which are made of sheet metal, can be hardened at a reasonable cost, before they are installed.

In an example embodiment, a pin, designed as a connecting pin, is located in the two external planet sub-carriers, and the pin supports, on the one hand, for example, a planet gear of the spur gear differential and supports, on the other hand, a planet gear of the planetary gear stage, so the number of pins can be reduced, a measure that in turn is advantageous for the assembly.

In an example embodiment, the connecting pin is inserted through the hole, which is surrounded by the remachined surface region, which forms a contact surface for a disk, which is designed so as to be hardened. In this case, the disk can be brought into contact with a planet gear of the planetary gear stage. Then the installation space can be used in a particularly efficient way, and the wear, which occurs when a planet gear of the superposition stage comes into contact with the central planet sub-carrier, can be reduced.

In an example embodiment, a pin, which is designed as a support pin, is located in a recess, which is designed, for example, as a through-hole, in the central planet sub-carrier and the external planet sub-carrier, which is at a distance from the additional planetary gear stage. While the narrower of the two planet gears of the spur gear differential and a planet gear of the additional planetary gear stage are mounted on the connecting pin, the wider of the two planet gears of a set of planet gears of the spur gear differential can be mounted on the support pin in an exclusive manner, and, as a result, it is possible to achieve an advantageous distribution of the forces.

In an example embodiment, the through-hole is surrounded by a bead that extends axially in the direction of the additional planetary gear stage. Then it is possible to effectively compensate for the forces occurring in the normal operating mode of the gear unit combination.

In an example embodiment, in order to prevent any interaction of the planet gear of the additional planetary gear stage with the bead, the bead, which extends completely around the through-hole, is set apart from the remachined surface region of the adjacent hole in the circumferential direction, for example, the bead is set apart by more than a tenth or a fifth of the diameter of the through-hole.

In an example embodiment, a radially projecting gear tooth system is formed on the outside of the planet carrier.

In an example embodiment, the gear tooth system is designed as an external gear tooth system on one of the planet sub-carriers, and/or for the external gear tooth system to be formed as a helical gear tooth system or as a straight gear tooth system, for example, as parking gear teeth. In the case that the external gear teeth are designed as parking gear teeth, a latching locking element, such as a parking lock device, can engage with the teeth of the external gear tooth system engage and can bring the gear unit to a complete standstill, so that it is no longer possible for a motor vehicle, in which the gear unit combination or more specifically the planetary gear unit is used, to roll. In many countries, precisely such parking gear teeth are necessary to fulfill legal requirements. In an example embodiment, such parking gear teeth are designed in such a way that the parking gear teeth counter-piece, for example, a parking lock device that is provided with pawls, can engage in a locking manner with the parking gear teeth, for example, at less than 6 km/h and in another embodiment cannot engage at a higher speed. By providing a helical gear tooth system, a driving moment can also be impressed on the planet carrier. In an example embodiment, straight teeth are used as parking gear teeth.

In an example embodiment, the planet carrier, which is designed as multiple parts, includes three or more planet sub-carriers. This arrangement simplifies assembly.

In an example embodiment, a central planet sub-carrier, which is arranged between two external planet sub-carriers, includes an external gear tooth system. In this arrangement, a symmetrical distribution of the forces and torques is easy to implement.

In an example embodiment, durability is increased if the planet sub-carrier having the external gear tooth system is designed as a solid component, as a casting or as a forging. In such an embodiment, it is easy to introduce the parking gear teeth, for example, by means of machining processes. In another embodiment, a planet sub-carrier is made of sheet metal.

In an example embodiment, the second planet gear is mounted by means of a pin, which extends from the one external planet sub-carrier, through the planet sub-carrier having the external gear tooth system, to the other external planet sub-carrier. This arrangement improves the torsion resistance and simplifies the assembly.

In an example embodiment, two of the planet sub-carriers, of which one of the planet sub-carriers is provided, for example, with an external gear tooth system, to form a housing of at least the differential transmission or the entire gear unit combination.

In an example embodiment, the load bearing capacity of the gear unit combination is increased if a central planet sub-carrier, which is located between two external planet sub-carriers, has a curved bar, which is located in a hole of one of the two external planet sub-carriers, where the hole is designed to match the bar.

In an example embodiment, the section of the bar arranged within the hole is machined in at least certain sections, for example, on the inside and the outside.

In an example embodiment, the stability increases greatly if the external planet sub-carrier, containing the hole, is welded to the planet sub-carrier, containing the bar, in the region of the bar.

In an example embodiment, the manufacturing cost can be reduced if the planet sub-carrier containing the hole is designed as a sheet metal component, for example; as an annular planet sub-carrier plate.

In an example embodiment, the planet sub-carrier plate contains holes, designed as slots, spaced apart at equal angles to each other, so it is possible to design the introduction of forces symmetrical, so that imbalances are prevented, and the durability of the system is improved.

In an example embodiment, the planet sub-carrier plate is a part of the additional planetary gear stage.

In an example embodiment, the central planet sub-carrier is riveted to an external planet sub-carrier, which is, for example, a part of the differential transmission. In another embodiment, there are always two rivets in each one of a plurality of depressions. In this case, the depressions are present on the side of the central planet sub-carrier that faces the planet sub-carrier containing the hole. The stability of the gear unit combination increases, resulting in reduced maintenance requirements.

In an example embodiment, three pocket-like depressions are present on the central planet sub-carrier and on the external planet sub-carrier, which is connected to the central planet sub-carrier and in which pairs of rivets are located without a projection in the axial direction.

In an example embodiment, a combination of a bearing sleeve and an associated separate slide ring is located between the sun gear and the planet gear carrier. This arrangement makes it possible to significantly reduce wear on the system.

In an example embodiment, tolerances can be compensated for by arranging the slide ring with a spring section, in order to be deformable in the diameter.

In an example embodiment, the spring section is designed as a resilient bar that is formed by means of one or more recesses on the slide ring. The slide ring can be arranged with a slight radial prestress between the sun gear and the planet gear carrier. In this way, the sun gear can be accurately centered, and the axial distances between it and the planet gears are precisely defined.

In an example embodiment, a slide ring, which is variably adjustable in regard to its spring action, can be used in a very cost efficient way, if the bar has the shape of a right angled "Z" in the circumferential direction. Such an arrangement produces recesses that are advantageous for the distribution of the lubricant and the flow through the slide ring. When the slide ring is in the stationary state, these recesses are used, in particular, as a lubricant reservoir, in which the lubricant can collect, in order to be redistributed again, in particular, on the sliding surface, in the normal operating mode. The net result is a uniform distribution of the lubricant.

In an example embodiment, assembly is eased if the slide ring is inserted by snap-fit suspension into the bearing sleeve.

In an example embodiment, production costs can be reduced if the bearing sleeve is made of sheet metal and surrounds the slide ring.

In an example embodiment, the slide ring is located between the two radially inwards extending bulges of the bearing sleeve, so the slide ring is axially stable relative to the bearing sleeve.

In an example embodiment, the planet carriers are made of thick sheet metal and have relatively large forming radii. Due to this, the leading portion of the sun gears is reduced. To compensate for this reduction, an angle washer with a bulging bead, which allows for a greater support width, is used. In an example embodiment, the washer is hardened and, thus, exhibits better wear properties.

In an example embodiment, a drive train of a motor vehicle, such as a passenger vehicle, a truck or a tractor, includes a gear unit combination, as disclosed above in accordance with the present disclosure.

BRIEF DESCRIPTION OF IRE DRAWINGS

The present invention will be explained in greater detail below on the basis of preferred exemplary embodiments in connection with the associated figures.

The figures show the following:

FIG. 1 is a perspective view of a gear unit combination shown from the side of a differential transmission;

FIG. 2 is a perspective view of the gear unit combination from FIG. 1 shown from the side of an additional planetary gear stage;

FIG. 3 is perspective view from the side of a differential transmission of a central planet sub-carrier, which is installed in the gear unit combination shown in FIGS. 1 and 2;

FIG. 4 is a perspective view of the central planet sub-carrier from FIG. 3 shown from the side of the additional planetary gear stage;

FIG. 5 is a longitudinal sectional view of the gear unit combination shown in FIGS. 1 and 2;

FIG. 6 is an enlarged view of the connecting region between two planet sub-carriers in the region of the differential transmission of the gear unit combination shown in FIG. 5;

FIG. 7 is a longitudinal sectional view of the gear unit combination shown in FIGS. 1, 2 and 5, in a plane in which a narrow planet gear of the differential transmission and a planet gear of the additional planetary gear stage are located;

FIG. 8 is a perspective, partially cut view of the gear unit combination shown in FIG. 7;

FIG. 11 is a plan view of the gear unit combination shown from the side of the differential transmission, as shown in FIGS. 1, 2, 5, and 7 to 10;

FIG. 12 is the gear unit combination shown in FIG. 11 in a view from the side;

FIG. 13 is a plan view of the gear unit combination shown in FIG. 11 shown from the side of the additional planetary gear stage;

DETAILED DESCRIPTION

Figure 10:
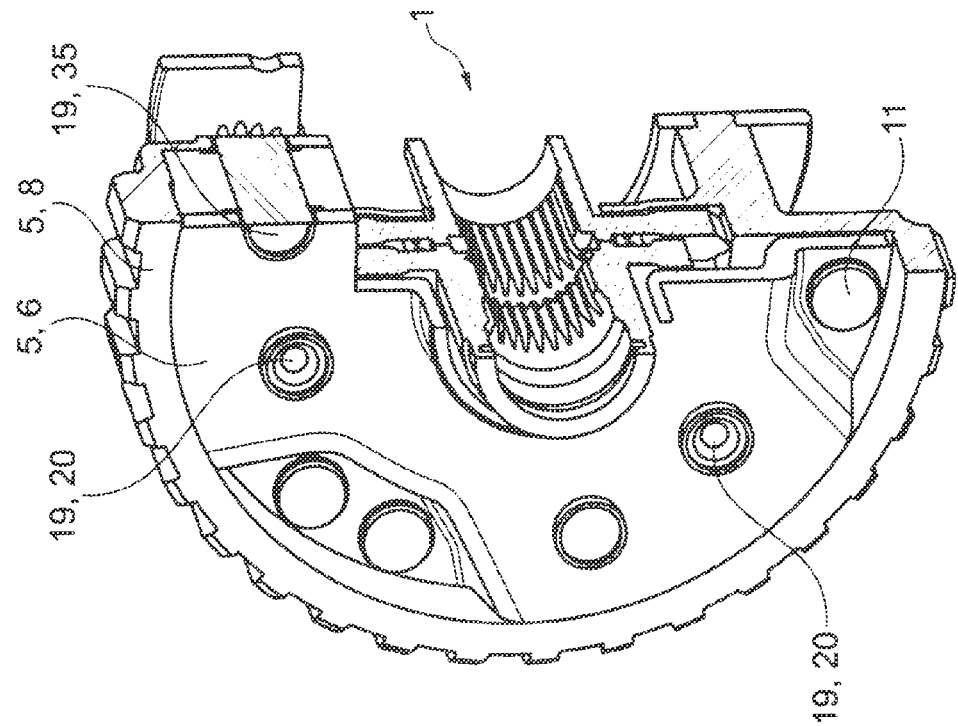
FIG. 10 is a partially cut, perspective view of the gear unit combination shown in FIG. 9.

At the outset, it should be appreciated that like drawing numbers on different drawing views identify identical, or functionally similar, structural elements of the invention. It is to be understood that the disclosure as claimed is not limited to the disclosed aspects.

Furthermore, it is understood that the claims are not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this invention belongs. It should be understood that any methods, devices or materials similar or equivalent to those described herein can be used in the practice or testing of the invention.

The figures are shown only in schematic form and only serve the purpose of a better understanding of the invention.

FIG. 1 shows a gear unit combination 1 as described herein. Gear unit combination 1 has a section, which is designed as a differential transmission 2. An additional section of gear unit combination 1 is configured as planetary gear stage 3, which supplements differential transmission 2. Differential transmission 2 is designed as a planetary gear unit, in particular, as a spur gear differential 4.

Gear unit combination 1 includes a planet carrier 5, of which an external planet sub-carrier 6, which is located on the side of the differential transmission, can be seen in FIG. 1. Another external planet sub-carrier 7, which is, however, a part of additional planetary gear stage 3, can also be seen in FIG. 2, where the side of planetary gear stage 3 is located in the foreground of the figure.

Between the two external planet sub-carriers 6 and 7 there is a central planet sub-carrier 8, which is ultimately a part of both differential transmission 2 and planetary gear stage 3.

The two external planet sub-carriers 6 and 7 as well as central planet sub-carrier 8 are connected to each other in a rotationally fixed manner and form planet carrier 5.

On the outside of planet carrier 5, which is arranged on central planet sub-carrier 8, a radially projecting gear tooth system 10 is arranged in the region of the largest diameter on outside 9 of planet carrier 5. Gear tooth system 10 has straight teeth in the manner of parking gear teeth. Central planet sub-carrier 8 is created as a casting or forging and is a solid component, which, in contrast to external planet sub-carrier 7 of planetary gear stage 3, is not formed as a sheet metal component, but rather as a component that is reworked by means of milting operations.

In the blocking state of gear unit combination 1 a parking lock device engages with gear tooth system 10. This parking lock device is not shown. External planet sub-carrier 6 of differential transmission 2 is connected to central planet sub-carrier 8 by means of rivets 11. In this case there are depressions 12 in the two planet sub-carriers 6 and 8, in which pairs of rivets 11 are arranged in such a way that a rotationally fixed connection between planet sub-carriers 6 and 8 is achieved.

Differential transmission 2 is designed as a spur gear differential transmission that includes multiple pairs 13 of planet gears 14 and 15. In contrast to second planet gear 15, first planet gear 14 has a greater axial length. The axial length is measured along the axis of rotation of gear unit combination 1. The varying axial length of the two planet gears 14 and 15 can be seen in FIG. 14.

Of both planet gears 14 and 15 of differential transmission component 2, FIG. 5 shows only second planet gear 15, as well as two additional planet gears 16 of additional planetary gear stage 3 between central planet sub-carrier 8 and external planet sub-carrier 7 of planetary gear stage 3. FIG. 5 also shows the presence of two sun gears 17 and 18. Sun gear 17 meshes with first planet gear 14, and sun gear 18 meshes with second planet gear 15. The two planet gears 14 and 15 of pair 13 of planet gears of differential transmission component 2 also mesh together.

Second planet gear 15 is also mounted on a pin 19. Pin 19 is also referred to as a connecting pin 20. Connecting pin 20 is located in hardened sleeves 21 in the two external planet sub-carriers 6 and 7. Sleeves 21 also have radially projecting flanges 22, which can be brought into contact with respective planet gears 15 and 16.

On a radially inner end of central planet sub-carrier 8 there is also a hardened disk 23, which can be brought into contact with sun gear 17.

The two sun gears 17 and 18 each have an internal gear tooth system, by means of which their torque transmitting elements can be introduced to the gears of a motor vehicle. Between the two sun gears 17 and 18 there is a friction disk 24. Friction disk 24 can also be referred to as a friction ring.

Connecting pin 20 can also have a longitudinal bore, which communicates with the transverse bores in such a way that lubricant can be moved into a region between connecting pin and planet gear 16. In this way, it is possible to supply oil, for example, and thereby reducing friction.

With respect to planetary gear stage 3, which is designed as a load stage, the corresponding ring gear and the sun gear configurations are not shown. The sun gear is usually arranged as a component that is connected to a hollow shaft. The ring gear, in turn, can have teeth on the outside or be flanged with a component of the gear tooth system.

It is also very clear from FIG. 5, that between planet gear 16 and central planet sub-carrier 8, there is a disk 25, which can also be referred to as a contact disk, which prevents wear at central planet sub-carrier 8, because, otherwise, such wear would occur upon impact of planet gear 16 during its rotation on central planet sub-carrier 8. Hence, disk 25 acts, just like radially projecting flanges 22 of sleeve 21, in a supporting manner. Disk 25 may be completely hardened, just like sleeve 21.

Planet carrier 5 forms the housing of gear unit combination 1 and could be referred to, in its entirety, as a bar.

However, in this case a bar 26 is construed as an axial extension of central planet sub-carrier 8.

It is shown in FIGS. 2 and 5 that axial end 27, which has been remachined, for example, remilled, on its radial interior 28 and on its radial exterior 29, projects freely into a hole 30 of external planet sub-carrier 7, which is designed in the manner of a plate. External planet sub-carrier 7 can also be referred to as the planet sub-carrier plate, in the same way as the planet sub-carrier forms, when considered by itself, a planet carrier plate.

Bar 26 is welded to this planet sub-carrier plate or more specifically to external planet sub-carrier 7. An induction welding process can be used for this weld.

While, high forces can be transmitted by means of the weld joint between external planet sub-carrier 7 and the central planet sub-carrier, high forces can also be transmitted by means of central planet sub-carrier 8 to external planet sub-carrier 6, because depression 12 makes it possible for rivet 11 to assume a compact rivet form. Rivet 11 and corresponding depression 12 always correspond to bar 26. Consequently, depression 1 is arranged radially outside bar 26, an arrangement that improves force transmissibility.

While assembled gear unit combination 1 is in the foreground in FIGS. 1 and 2, only central planet sub-carrier 8 is in the foreground in FIGS. 3 and 4. On a side 31 of central planet sub-carrier 8 that faces external planet sub-carrier 6, there are material recesses 32, in order to receive first planet gears 14. Material recesses 32 pass over into holes 33 and 34 that are designed as through-bores. Holes 33 and 34 are provided to receive pins 19.

Connecting pin 20 is inserted into hole 33, and a support pin 35 is inserted into hole 34. Support pin 35 is a special variant of pin 19 and bears only planet gear 14. On the other side, as shown in FIG. 4, i.e., on the side of additional planetary gear stage 3, hole 35 is surrounded by a bead 36.

Hole 33 is surrounded by a surface region 37 that is arranged concentrically to the hole. Surface region 37 is moved with respect to surface 38 of central planet sub-carrier 8 axially in the direction away from external planet sub-carrier 7. This offsetting is ensured by a metal-cutting operation, for example, by a milling process. Polishing and lapping processes can also be used to this end.

Gear unit combination 1 has three depressions 12, where each depression includes two rivets 11, three bars 26, three holes 33 and three holes 34. These components are uniformly distributed relative to an axis of rotation (not shown) of gear unit combination 1. However, holes 33 and 34 are not located on the same diameter of the pitch circle. The tip diameter of the two sun gears 17 and 18 is different, with the tip diameter of the small sun gear being smaller than the root diameter of the large sun gear. In an example embodiment, the small sun gear is 20% smaller than the large sun gear. In the traction mode the smaller planet gear of pair 13 of planet gears runs faster than the large planet gear. This reduces the amount of noise generated. Moreover, problems that also arise with respect to the support width are reduced. Even locking values of up to 30% can be achieved without causing any major problems. As a result, it is possible to generate a so-called Torsen differential.

Bead 36 is set at a distance of a seventh of the diameter of hole 34 away from machined surface region 37. Hole 33 can also be designed as a blind hole.

FIG. 4 shows that bar 26 is configured so as to be bent in the circumferential direction. The section of bar 26 that is formed by means of axial end 27 is remachined.

With reference to FIG. 13, the matching curved design of hole 30 in external planet sub-carrier 7 is also shown. Hole 30 extends further than bar 26 in the circumferential direction, so that both sides of bar 36 produce, when viewed in the circumferential direction, cavities 39. Holes 30 are designed as slots, are the same distance apart from each other in the circumferential direction, and have the same length in the circumferential direction. However, it is also possible for one of the slots to be longer than the other slots.

External planet sub-carrier 7, which is made as a sheet metal component, need not necessarily be an annular plate of the planet sub-carrier, but rather it can also be produced as a casting or forging.

While FIGS. 1 to 5 show gear tooth system 10 on the outside of central planet sub-carrier 8, FIG. 6 shows only a short design of rivets 11, which are inserted into depressions 12, in order to ensure the rotationally fixed connection of central planet sub-carrier 8 to external planet sub-carrier 6.

Figure 9:
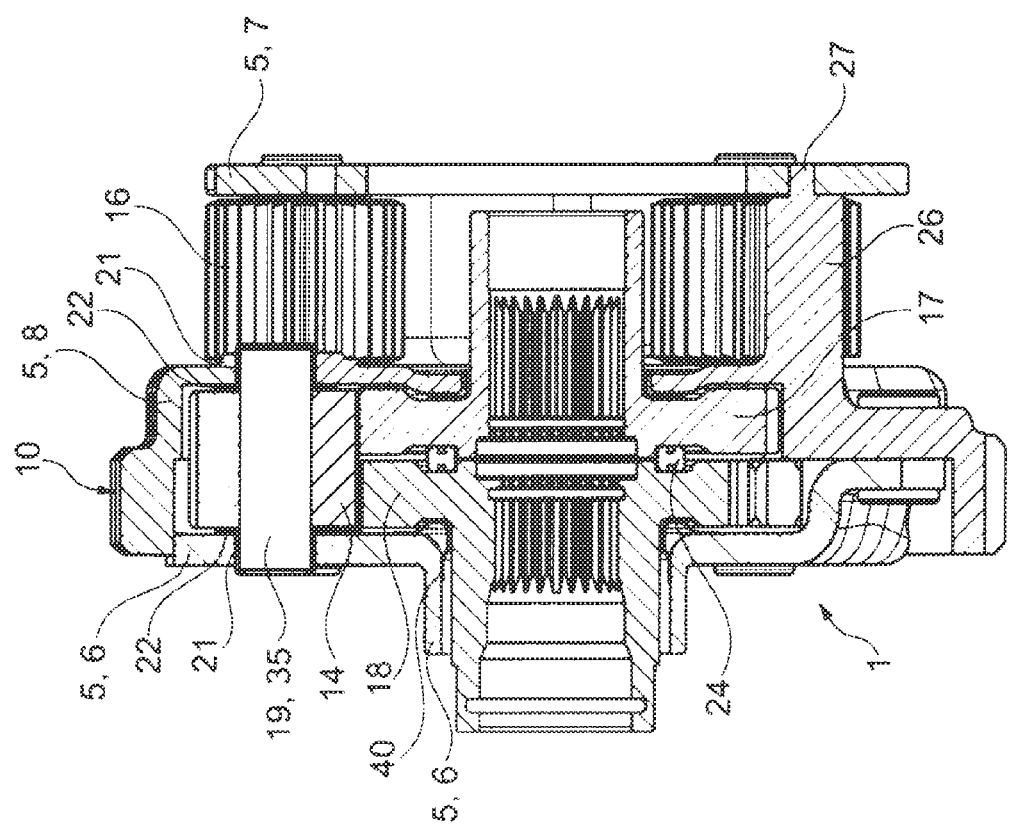
FIG. 9 is a longitudinal sectional view of the gear unit combination shown in FIGS. 1, 2, 5 and 7 in a plane in which only a wide planet gear of the differential transmission is located.
Figure 15:
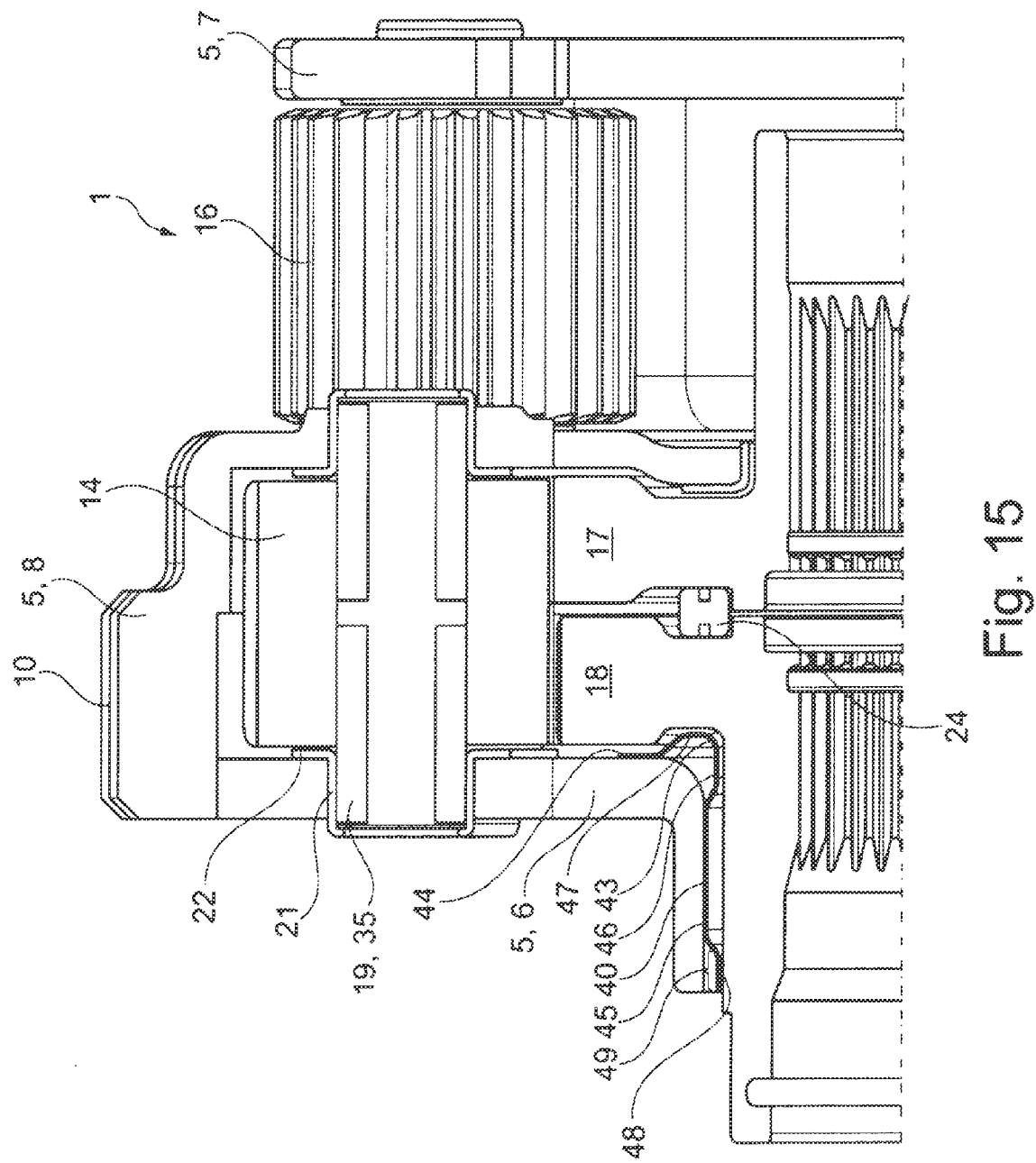
FIG. 15 is a longitudinal sectional view of a part of the gear unit combination with a bearing sleeve, which is located between a sun gear and an external planet sub-carrier.
Figure 16:
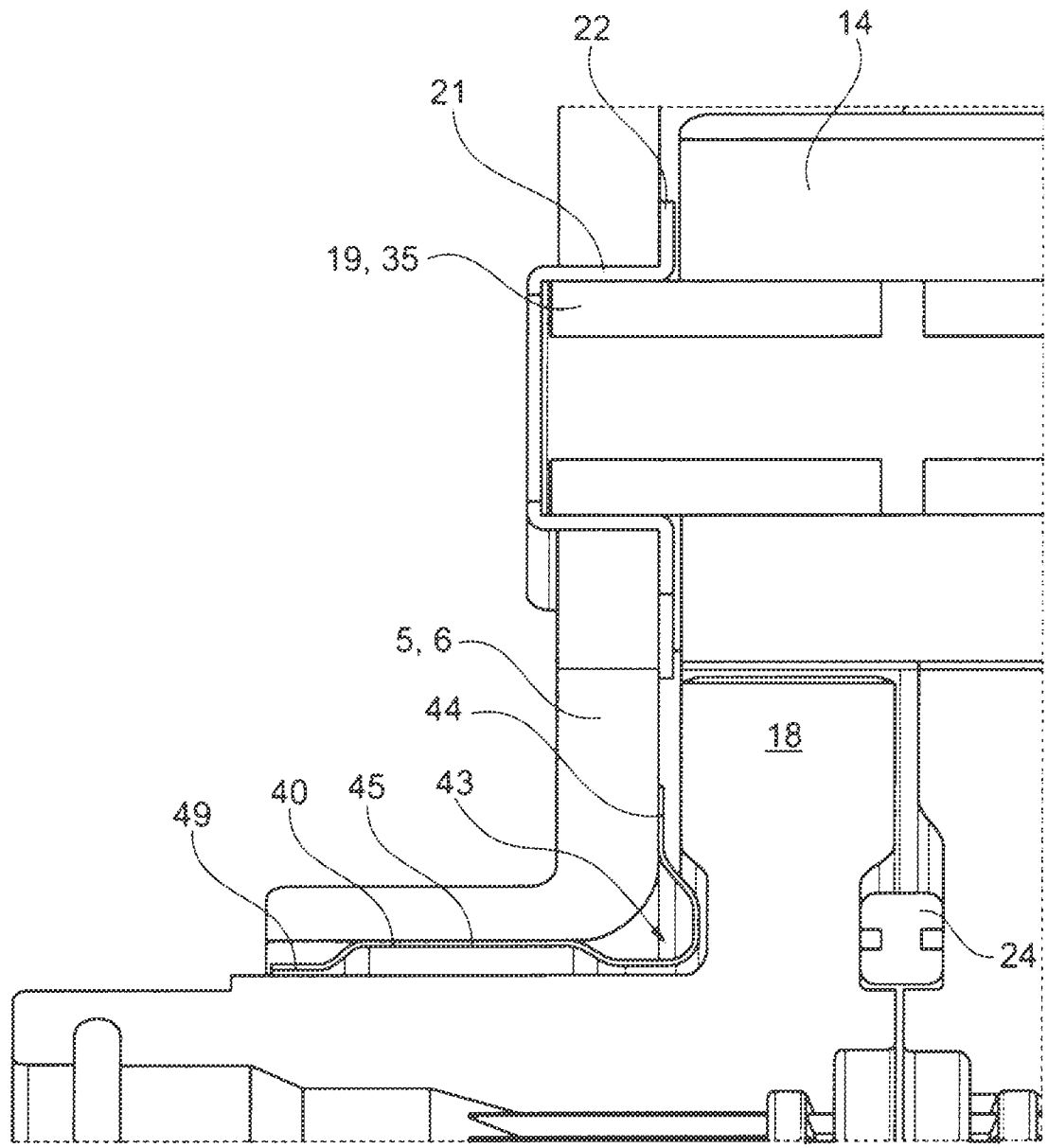
FIG. 16 is an enlarged view of the region in which the bearing sleeve shown in FIG. 15 is located.
Figure 25:
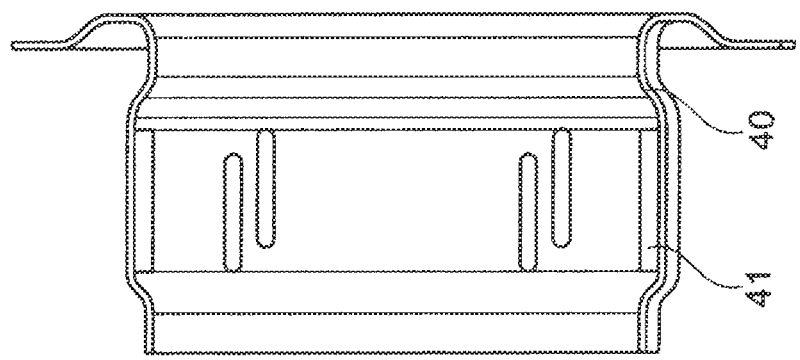
FIG. 25 is a cut view of the slide ring shown in FIG. 24 that is installed in a bearing sleeve.
Figure 26:
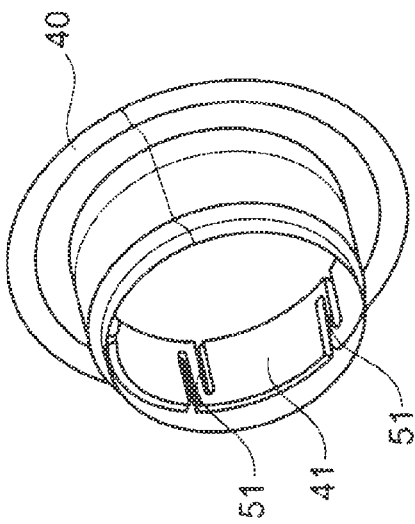
FIG. 26 is a perspective view of only the bearing sleeve and the slide ring; and, FIG. 27 is a longitudinal sectional view of the slide ring shown in FIG. 24.

It can be seen in FIGS. 5 and 7 that there is a bearing sleeve 40 between sun gear 18 and external planet sub-carrier 6. Bearing sleeve 40 is also shown in FIG. 9. However, as shown in FIG. 15, a modified form of a bearing sleeve 40 can be used. Bearing sleeve 40 as shown therein is also shown in FIG. 16. This second embodiment of bearing sleeve 40 is axially longer than bearing sleeve 40 as shown in FIGS. 7 and 9. For reference, the shorter bearing sleeve shown therein is also shown in FIGS. 17 to 22, whereas the longer variant of bearing sleeve 40 is shown in FIGS. 23, 25, and 26.

A slide ring 41 is also used with the longer variant of bearing sleeve 40 that is shown in FIGS. 23 to 27.

FIGS. 7 and 8 show the mounting of both planet gear 16 and second planet gear 15 on pin 19, i.e., connecting pin 20. FIGS. 9 and 10 show the mounting of support pin 35. Support pin 35 carries only first planet gear 14. The entire assembly of gear unit combination 1 can be seen when FIGS. 11 to 13 are considered together. FIGS. 11 to 13 also show that axial ends 27 of bars 26 are fitted into correspondingly shaped holes 30.

Figure 14:
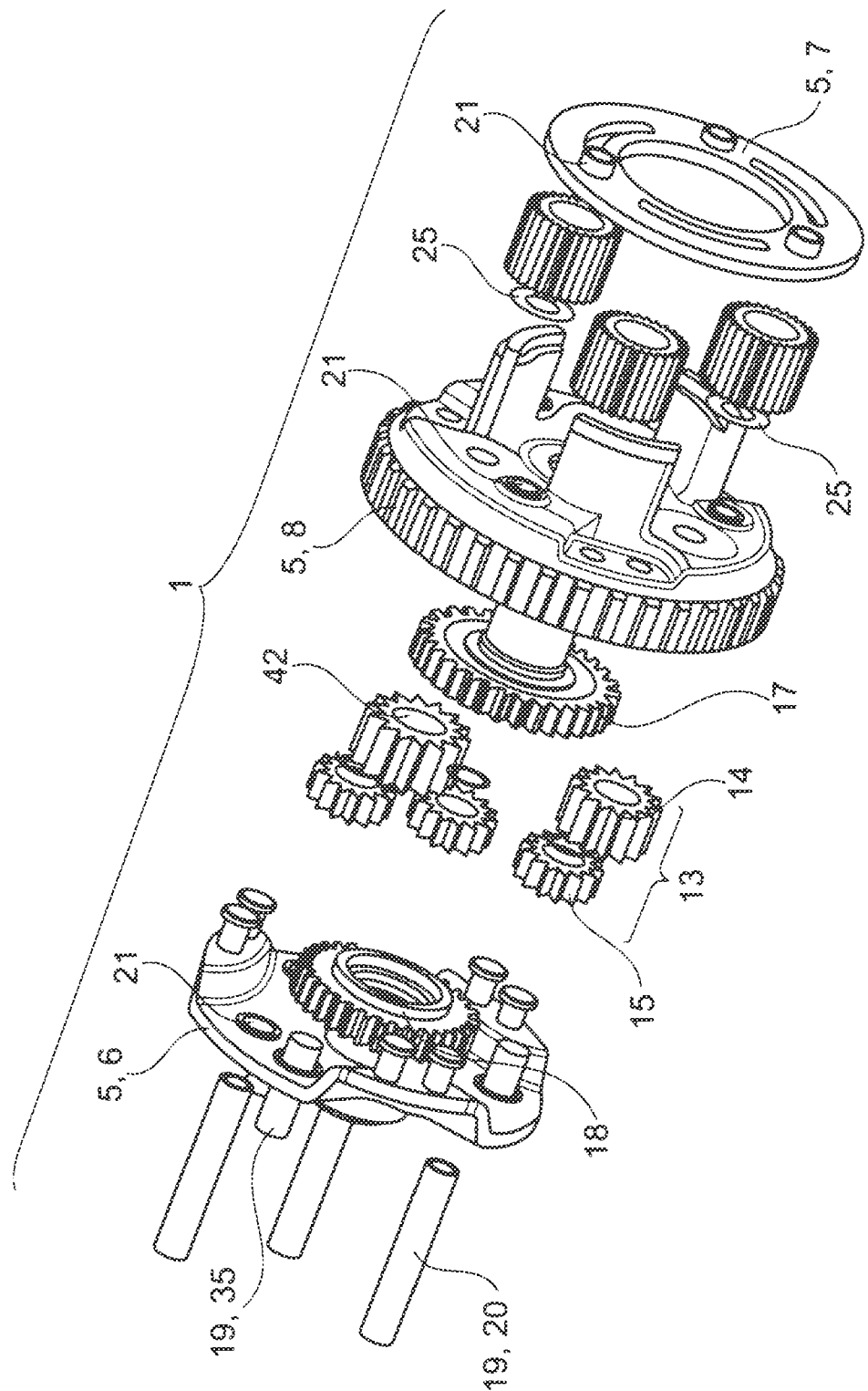
FIG. 14 is an exploded view of the gear unit combination shown in FIGS. 1, 2, 5, and 7 to 13.

In the example embodiment shown in FIG. 14, sleeves 21 are already mounted in external planet sub-carrier 6, external planet sub-carrier 7, and central planet sub-carrier 8. The axial length of connecting pin 20 varies in relation to support pin 35 in such a way that support pins 35 are about half as long as connecting pins 20. In order to support individual planet gears 15 and 16, hardened disks 23 and rings 42 are used, and rings 42 can also be hardened.

Figure 17:
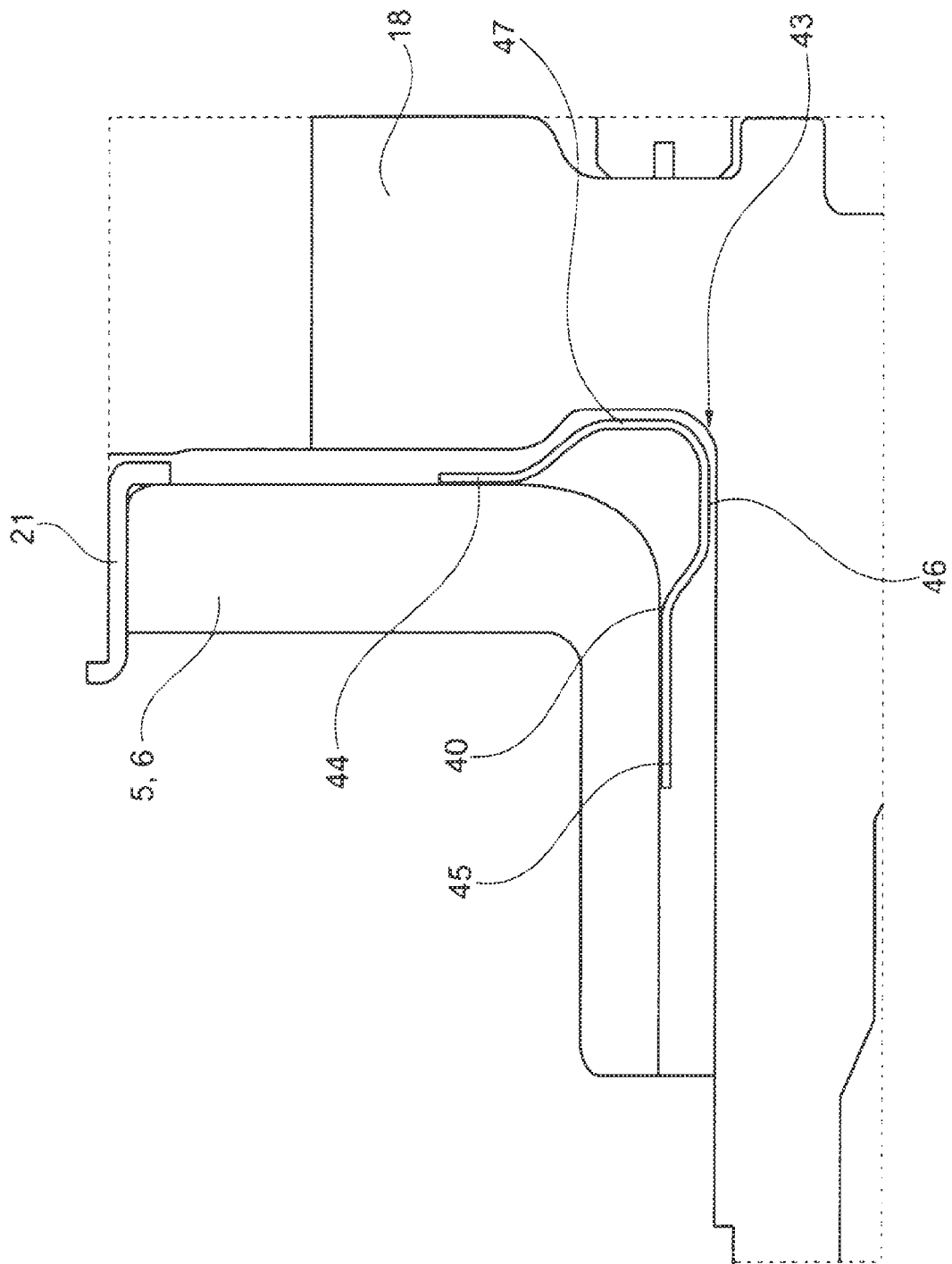
FIG. 17 is an additional enlarged view of the region of the gear unit combination, in which the bearing sleeve is located.

Bearing sleeve 40 is designed, as shown in FIGS. 15 and 17, in such a way that bearing sleeve 40 acts in a supporting manner on sun gear 18 in the axial and radial direction. Furthermore, bearing sleeve 40 holds sun gear 18 axially and radially spaced apart from external planet sub-carrier 6. For this purpose, bearing sleeve 40 has at least one bulge 43 that is located between a radially outwards projecting support region 44 and an axially aligned contact region 45. Bearing sleeve 40 is located in contact region 45 in a press fit with external planet sub-carrier 6.

Bulge 43 has a first hardness region 46, which extends in the axial direction, and a second hardness region 47, which is disposed at a right angle to the first hardness region and which extends in the radial direction.

Spaced apart from first hardness region 46 by means of axially aligned contact region 45, a third hardness region 48 is located in the region of a securing region 49, which extends in the axial direction in such a way that it is offset radially inwards.

In order to form three hardness regions 46, 47, 48, induction hardening or case hardening can be used.

As shown in FIG. 16, two radial bearing regions that are axially spaced apart from each other in bearing sleeve 40 are formed relative to sun gear 18 in the region of bulge 43 and securing region 49. Additionally, an axial bearing region is formed. Bearing sleeve 40 can be arranged to have spring properties in certain sections, in order to compensate for tolerances and to damp any shocks that might occur.

In the installed state there is no play between axial contact region 45 and external planet sub-carrier 6, whereas between first hardness region 46 of bulge 43 and an axially extending flange region of sun gear 18, play is still present, just as between second hardness region 47 and a radially extending section of sun gear 18. Bulge 43 can also follow the outer contour of sun gear 18 at an angle of 90° and can maintain a distance that is as short as possible.

The variant of bearing sleeve 40 shown in FIGS. 18 to 22 has a shorter axial length than, for example, bearing sleeve 40 as shown in FIG. 16. The smallest diameter of bearing sleeve 40 ranges from 43 to 45 mm, for example, 44 mm. The outer diameter in the region of axially aligned contact region 45 is approximately 10% more, and is, for example, 47.9 mm. The entire outer diameter of the largest point has a value of approximately 68 mm. In an example embodiment, the outer diameter of the largest point is one third greater than the inner diameter of the smallest point of bearing sleeve 40. In an example embodiment, the axial length is more than a quarter of the inner diameter, but less than half of the inner diameter; for example, the axial length is 16 mm. Bearing sleeve 40 from FIG. 21 has a wall of constant thickness.

Figure 21:
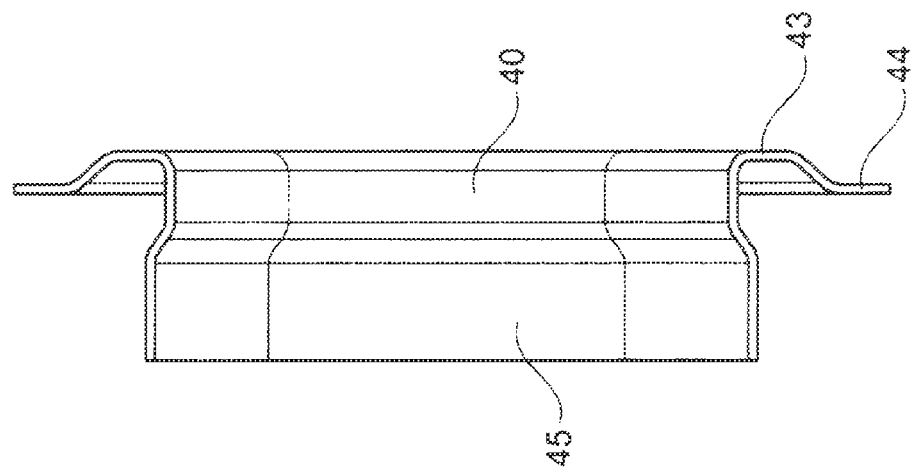
FIG. 21 is an enlarged view of a cut alternative bearing sleeve, as shown in FIGS. 18 to 20.
Figure 19:
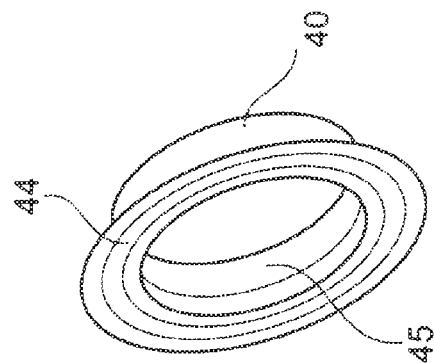
FIG. 19 is a perspective view of a variant of a bearing sleeve for the gear unit combination shown in FIG. 1.
Figure 20:
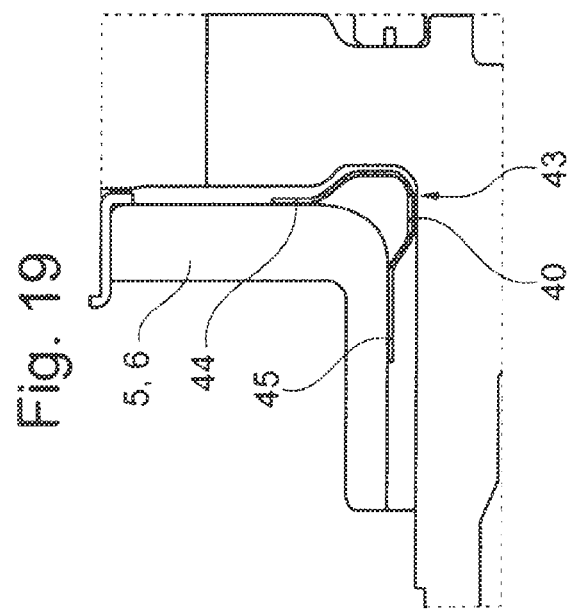
FIG. 20 is a sectional view of a part of the gear unit combination including the installed alternative bearing sleeve.
Figure 18:
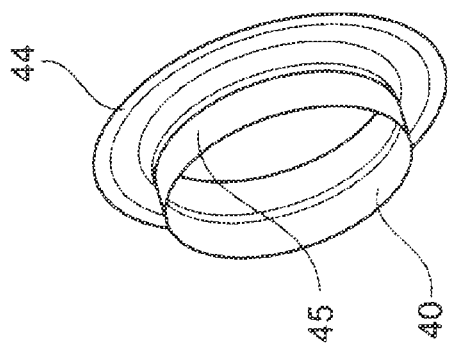
FIG. 18 is a perspective view of a variant of a bearing sleeve for the gear unit combination shown in FIG. 1.
Figure 22:
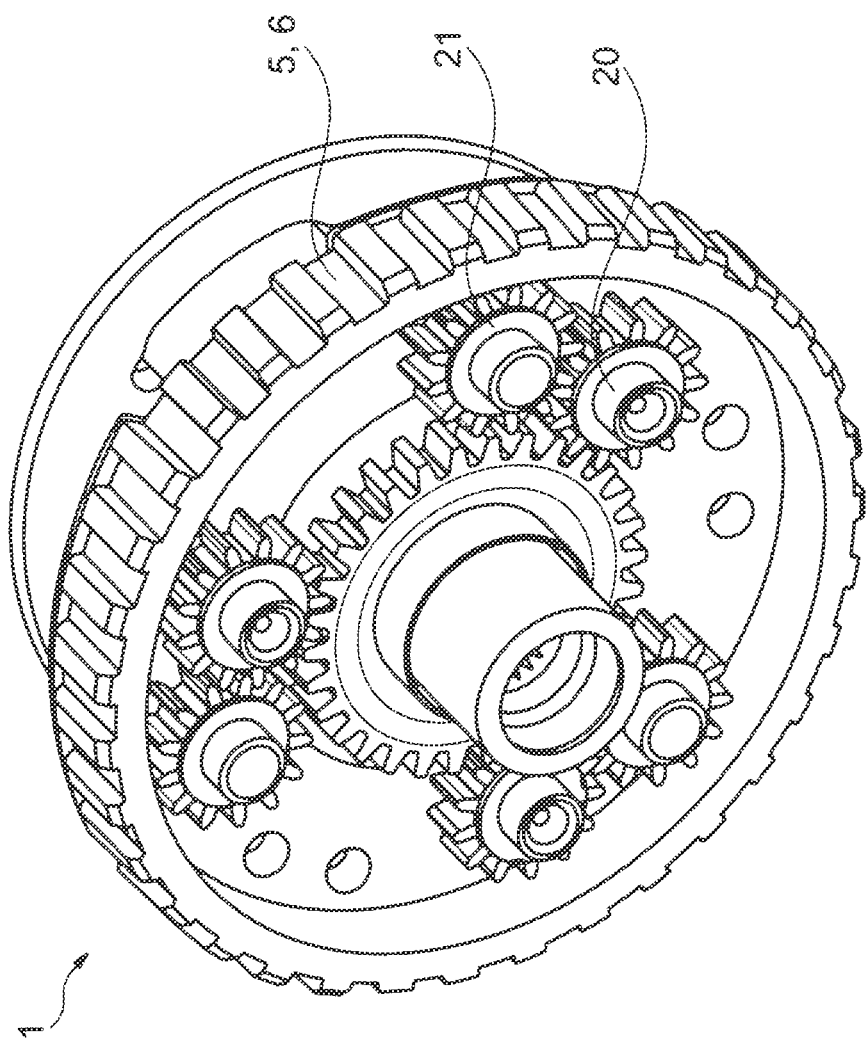
FIG. 22 is a perspective plan view of a variant of a gear unit combination with an installed bearing sleeve.
Figure 23:
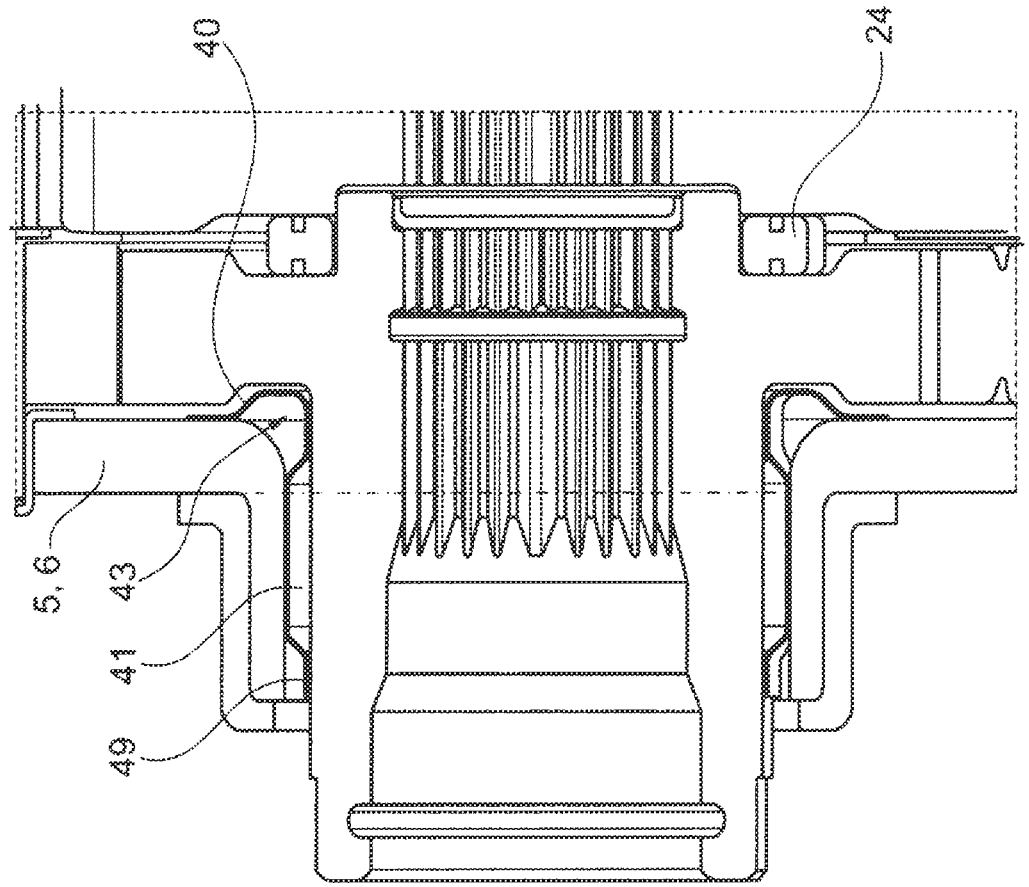
FIG. 23 is a sectional view of a variant of a gear unit combination shown in the region of a bearing sleeve between one of the sun gears and the external planet sub-carrier, with a slide ring that is located between the bearing sleeve and an axial flange region of the sun gear.

In FIG. 22 bearing sleeve 40 from FIG. 21 is installed into gear unit combination 1.

Figure 24:
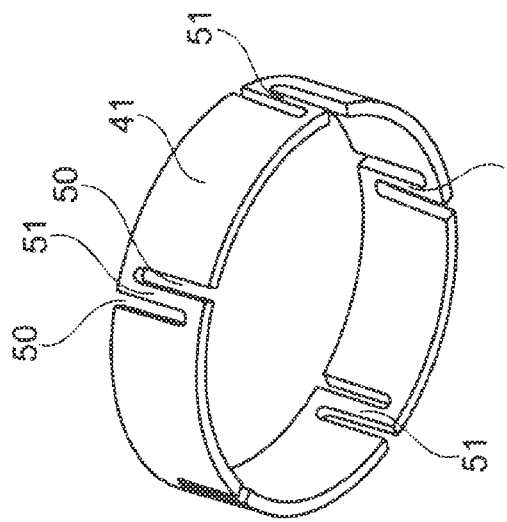
FIG. 24 is a perspective view of only the slide ring, as it is shown in FIG. 23.
Figure 27:
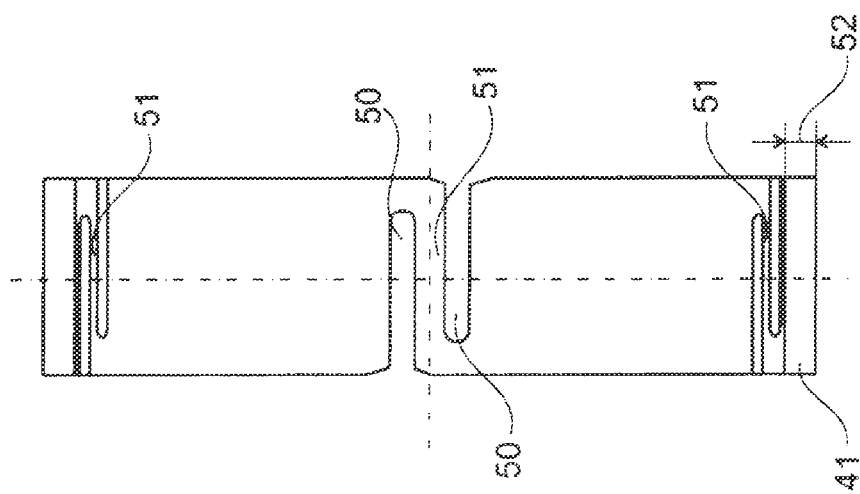

Slide ring 41, is shown as a single slide ring in FIGS. 24 and 27, and is installed as is shown in FIGS. 23, 25, and 26.

The arrangement of slide ring 41 radially inside bearing sleeve 40 and axially between bulge 43 and axially aligned contact region 45 can be seen in FIGS. 23, 25, and 26.

Slide ring 41 has recesses 50 such that resilient bars 51, which are also known as spring bars, are formed. Recesses 50 can be arranged in the manner of a labyrinth. However, recess 50 can be arranged so that one axial side is aligned relative to the other axial side, so that in each case a recess begins from the one side, and the other recess 50 begins from the other side, so that a right angled "Z" is formed. Slide ring 41 is made of a synthetic plastic material. Resilient bars 51 are uniformly distributed over the periphery. Bearing sleeve 40 may also be made of other materials than spring steel, such as other types of sheet metal. Slide ring 41 can be inserted and snap-fitted into the expansion which is present between contact region 45 and securing region 49. Securing region 49, which can be moved radially inwards, can also be referred to as a bulge.

The five bars 51 make it possible to change the diameter of slide ring 41. A thickness 52 of slide ring 41 is greater than the width of recess 51) measured in the circumferential direction, as can be seen in FIG. 77.

LIST OF REFERENCE NUMERALS 1 gear unit combination
2 differential transmission
3 planetary gear stage
4 spur gear differential
5 planet carrier
6 external planet sub-carrier of the differential transmission
7 external planet sub-carrier of the planetary gear stage
8 central planet sub-carrier
9 exterior
10 gear tooth system
11 rivet
12 depression
13 pair
14 first planet gear
15 second planet gear
16 planet gear of the planetary gear stage
17 sun gear
18 sun gear
19 pin
20 connecting pin
21 sleeve
22 radially projecting flange
23 disk between the central planet sub-carrier and the first sun gear
24 friction disk/friction ring
25 disk between the planet gear of the planetary gear stage and the central planet sub-carrier
26 bar
27 axial end
28 radial interior
29 radial exterior
30 hole in the external planet sub-carrier
31 side
32 material recess
33 hole for the connecting pin
34 hole for the support pin
35 support pin
36 bead
37 surface region
38 surface
39 cavity
40 bearing sleeve
41 slide ring
42 ring
43 bulge
44 radially projecting support region
45 axially aligned contact region
46 first hardness region (axially aligned)
47 second hardness region (radially aligned)
48 third hardness region (axially aligned)
49 securing region that is moved radially inwards
50 recess
51 resilient bar
52 thickness

The invention claimed is:
1. A planetary gear unit, comprising:
at least one sun gear;
at least one planet carrier arranged coaxially and rotatable in relation to the at least one sun gear; and, a bearing sleeve:
: arranged between the at least one sun gear and the planet carrier;
: the bearing sleeve acts in a supporting manner on the at least one sun gear axially or radially relative to the planet carrier; and,
: including:
:: a radially outwards projecting support region in contact with the at least one planet carrier;
:: an axially aligned region in contact with the at least one planet carrier; and,
:: a bulge extending radially and axially from the axially aligned region and free of contact with the at least one planet carrier.

2. The planetary gear unit of claim 1, wherein the bearing sleeve has spring properties.

3. A gear unit combination comprising:
a differential transmission including:
: a first sun gear;
: a first planet carrier;
: a first pin connected to the first planet carrier; and,
: a first planet gear:
:: meshed with the first sun gear;
:: mounted on the first pin; and,
:: rotatable about the first pin;
a planetary gear stage including:
: a second sun gear;
: a second planet carrier; and,
: a second planet gear:
:: meshed with the second sun gear;
:: mounted on the first pin; and,
:: rotatable about the first pin;
a common planet carrier through which the first pin passes, the common planet carrier including a gear tooth system around an outer circumference of the common planet carrier; and,
a bearing sleeve:
: between the first sun gear and the first planet carrier;
: arranged to axially or radially position the first sun gear; and,
: including:
:: a radially outwards projecting support region in contact with the at least one planet carrier;
:: an axially aligned region in contact with the at least one planet carrier; and,
:: a bulge extending radially and axially from the axially aligned region and free of contact with the at least one planet carrier.

4. The gear unit combination of claim 3, wherein the bearing sleeve has at least one bulge including:
: a radially outwards projecting support region in contact with the at least one planet carrier;
: an axially aligned region in contact with the at least one planet carrier; and,
: a bulge extending radially inward from the axially aligned region.

5. The gear unit combination of claim 4, wherein at least one section of the bulge is hardened and the bearing sleeve has elastic spring properties.

6. The gear unit combination of claim 4, wherein the bearing sleeve has a supporting region arranged to extend radially outwards from the bulge and to contact the at least one external planet sub-carrier.

7. The gear unit combination of claim 3, wherein the bearing sleeve is fabricated from sheet metal and is arranged by force fit radially in the at least one external planet sub-carrier.

8. The gear unit combination of claim 3, wherein the bulge is arranged to have a first hardness region extending axially in the direction of the at least one spur gear, a second hardness region extending radially inward, and a third hardness region arranged axially separate from the second hardness region and on the side of the second hardness region distal the spur gear.

9. The gear unit combination of claim 3, wherein:
: one of the first or second planet gears is shorter than the other of the first or second planet gears; and
: a friction disk is arranged between the first and second sun gears.

10. A drive train for a motor vehicle comprising the gear unit combination of claim 3.

11. A planetary gear unit, comprising:
: at least one sun gear; at least one planet carrier arranged coaxially and rotatable in relation to the at least one sun gear; and,
: a bearing sleeve:
:: arranged between the at least one sun gear and the planet carrier;
:: the bearing sleeve acts in a supporting manner on the at least one sun gear axially or radially relative to the planet carrier; and,
:: including:
::: a radially outwards projecting support region in contact with the at least one planet carrier;
::: a first axially aligned region in contact with the at least one planet carrier; and,
::: a bulge extending radially inward from the first axially aligned region, wherein the bulge includes:
: a second axially aligned region with a first hardness; and,
: a first region disposed at a right angle to the second axially aligned region and with a second hardness different from the first hardness.

12. The planetary gear unit of claim 11, wherein the bulge is free of contact with the at least one planetary carrier.

* * * * *